July 5, 1938. G. F. JACKSON 2,123,108
BRAKE SHOE KEY
Filed Nov. 20, 1937
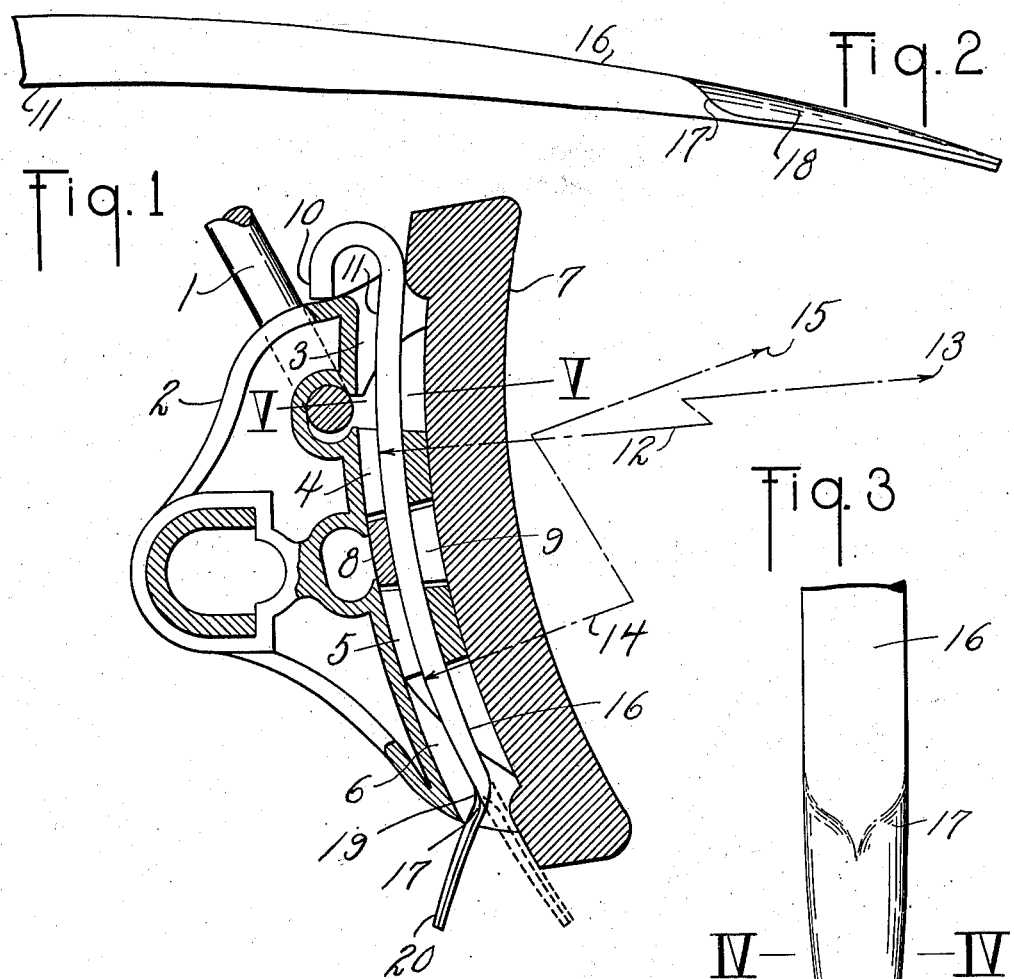
George F. Jackson
Inventor
By Geo E Kirk
Attorney Patented July 5, 1938

2,123,108

UNITED STATES PATENT OFFICE 2,123,108

BRAKE SHOE KEY

George F. Jackson, Toledo, Ohio

Application November 20, 1937, Serial No. 175,549

3 Claims. (Cl. 188—243)

This invention relates to brake shoe key for maintained assembly.

This invention has utility when incorporated in keys deformable for self-locking between the brake head and the brake shoe.

Referring to the drawing:

Fig. 1 is a section through a brake shoe and its hanger or brake head mounting, more particularly as designed for railway rolling stock and equipped with the brake shoe key of the invention herein;

Fig. 2 is a fragmentary view of the lower or tapered portion of the key of Fig. 1;

Fig. 3 is a fragmentary view of the tip portion of the key of Fig. 2;

Fig. 4 is a section on the line IV—IV, Fig. 3; and

Fig. 5 is a section on the line V—V, Fig. 1.

Arm 1 swingably supports brake head 2 having openings 3, 4, 5, 6, in association with which may be mounted brake shoe 7 adapted to be thrown against the tire of a railway car wheel. This brake shoe 7 has medial projection 8 with eye 9. This projection 8 is introduced between the eye-carrying opening means 4, 5, of the brake head. In this assembled position, there is provided a key of forged steel having return bend 10 forming a head with body 11 therefrom of approximately the same cross section dimensions as the head return bend 10. This key retains its cross section dimensions not only through the opening 3 but through the eyes 4, 9, 5, in close holding or tight position for registry therewith to lock the shoe 7 against any movement whatsoever as to the brake head 2.

In this set-up the key is substantial and of general arc form on radius 12 from remote center 13. As emerging from the eye 5, this key has its curvature on the side away from the shoe changed to provide a taper while preserving this rectangular cross-section. For this taper portion, radius line 14 extends to remote center 15 approximately the same radial distance as the center 13 but offset therefrom. There is accordingly provided a rectangular taper portion 16 for this brake shoe key as extending or merging directly into the rectangular constant cross-section portion 11.

Adjacent the outlet for the opening 6 in the brake head, this key has more abruptly reduced cross-section 17 to half oval portion 18 as a tip protruding beyond the brake shoe and brake head. Accordingly, as this key has been inserted in the fixed assembly between the brake shoe and brake head, this protruding tip portion 18 may be struck or forced away from the brake shoe 7 for locating bend 19 and with offset terminus 20 in position to draw the return bend 10 into wedge engagement with the brake head 2 remote from this tip 20. Accordingly, in this set-up or assembly, there is a holding of this shoe as to the head by the key, even in tipple dumping of cars. This holding is against vibration and tendency to wear on the key, shoe or head. However, it is readily practicable to replace the shoe as worn, even without destroying the key, for by striking the protruding tip 20 to reverse its bend from full line to dotted line position in Fig. 1, there is key loosening with the return bend accessible for a tool to engage therewith to straighten out the key. As so straightened out, the key may be re-inserted for re-assembly of the shoe with the head and the bend again effected for similar locking and effective holding for upkeep.

What is claimed and it is desired to secure by Letters Patent is:

1. A brake shoe key having a return bend head, a rectangular body therefrom of uniform cross-section throughout its engagement extent with aligned openings of the brake shoe and brake head, said key having a projecting portion beyond said openings providing a first reduced rectangular cross-section and abruptly therefrom an approximately half oval cross-section in providing adjacent the junction between said half oval and reduced rectangular cross-section portions a region adapted to bend in opposing the return bend of the head and thereby effective to hold the key in locked position assembled between the brake head and brake shoe.

2. Brake construction of the class described including a brake head and a brake shoe having interfitting lugs providing a series of aligned eyes and a clearway, and a brake shoe key having a return bend head with its terminus against the brake head and its body therefrom extending through said eyes to assemble the brake shoe with the brake head, said brake key having an abruptly reduced cross-section as a bend localizing region in the clearway between the brake head and the brake shoe, said reduced portion continuing beyond the brake head extent to provide a portion to engage the brake head upon bending as a fulcrum to draw against the return bend head to place said key under tension in locking position.

3. Brake construction of the class described including a brake head and a brake shoe having interfitting lugs providing a series of aligned eyes and a clearway, and a brake shoe key having a return bend head with its terminus against the brake head and its body therefrom extending through said eyes to assemble the brake shoe with the brake head, said brake key having an abruptly reduced cross-section as a bend localizing region in the clearway between the brake head and the brake shoe, said reduced portion continuing beyond the brake head extent to provide a portion to engage the brake head upon bending as a fulcrum to draw against the return bend head to place said key under tension in locking position, said reduced portion extending beyond the brake head to provide a substantial striking surface to return the bent portion to approximately normal position.

GEORGE F. JACKSON.